United States Patent
Boyer et al.

(10) Patent No.: US 7,182,922 B2
(45) Date of Patent: Feb. 27, 2007

(54) DEVICE FOR MIXING AND DISTRIBUTING A GAS PHASE AND A LIQUID PHASE SUPPLIED TO A GRANULAR BED

(75) Inventors: Christophe Boyer, Charly (FR); Vincent Coupard, Vaulx en Velin (FR)

(73) Assignee: Institut Francais du Petrole, Rueil Malmaison Cedex (FR)

(*) Notice: Subject to any disclaimer, the term of this patent is extended or adjusted under 35 U.S.C. 154(b) by 314 days.

(21) Appl. No.: 10/815,827

(22) Filed: Apr. 2, 2004

(65) Prior Publication Data

US 2004/0197245 A1 Oct. 7, 2004

(30) Foreign Application Priority Data

Apr. 2, 2003 (FR) .................................. 03 04120

(51) Int. Cl.
*B01J 8/04* (2006.01)
*C10G 45/00* (2006.01)
*B01F 3/04* (2006.01)

(52) U.S. Cl. .................. 422/195; 422/196; 422/197; 422/215; 422/220; 208/210; 208/211; 261/96

(58) Field of Classification Search ................ 422/195, 422/196, 197, 215, 220; 208/210, 211; 261/96
See application file for complete search history.

(56) References Cited

U.S. PATENT DOCUMENTS

| | | | | |
|---|---|---|---|---|
| 3,977,834 | A * | 8/1976 | Alcock et al. | 422/191 |
| 4,839,108 | A * | 6/1989 | Silvey | 261/97 |
| 4,894,205 | A * | 1/1990 | Westerman et al. | 422/197 |
| 5,799,877 | A * | 9/1998 | Gupta et al. | 239/8 |
| 5,837,208 | A * | 11/1998 | Grott et al. | 422/195 |
| 5,869,541 | A * | 2/1999 | Euzen et al. | 518/700 |
| 6,017,443 | A * | 1/2000 | Buchanan | 208/210 |
| 6,554,994 | B1 * | 4/2003 | Reynolds et al. | 208/211 |
| 6,613,219 | B2 * | 9/2003 | Harter et al. | 208/146 |
| 6,824,675 | B2 * | 11/2004 | Boyer et al. | 208/146 |
| 2002/0020359 | A1 * | 2/2002 | Boyer et al. | 118/726 |
| 2002/0021991 | A1 * | 2/2002 | Boyer et al. | 422/195 |
| 2004/0028579 | A1 * | 2/2004 | Van Der Meer et al. | 422/194 |
| 2005/0062178 | A1 * | 3/2005 | Harter et al. | 261/96 |

FOREIGN PATENT DOCUMENTS

FR 2842435 7/2002

\* cited by examiner

*Primary Examiner*—N. Bhat
(74) *Attorney, Agent, or Firm*—Millen, White, Zelano & Branigan, P.C.

(57) ABSTRACT

For mixing and distributing a gas phase and a liquid phase over a granular bed, employing an annular peripheral zone inside a reactor via which liquid is introduced and which acts as a buffer zone against fluctuations in the flow of the liquid phase. The device is applicable to catalytic bed chemical reactors especially for the hydrotreatment of hydrocarbons.

14 Claims, 5 Drawing Sheets

Figure n°1

Figure n°1bis

Figure n°2

Figure n°2bis

DEVICE FOR MIXING AND DISTRIBUTING A GAS PHASE AND A LIQUID PHASE SUPPLIED TO A GRANULAR BED

FIELD OF THE INVENTION

In a great deal of equipment and chemical processes, a gas phase and a liquid phase have to be distributed in as homogeneous a manner as possible, primarily to ensure the desired proportion between the different fluids or reagents. It is also necessary to ensure a substantially even distribution of the fluids or reagents along the frontal surface of a reactor so that the different zones of the reactor work under substantially identical conditions.

PRIOR ART

The present invention constitutes an improvement to a distributing and mixing device described in French patent application 02/09076. The device described in that application comprises supply means to distributor plates intended to equip fixed bed reactors operating in certain gas/liquid ratios, which can define an interface which is as stable as possible over the entire envisaged operating range of the reactor between the liquid phase and the gas phase. The distributor plate itself contains a plurality of conduits traversing said plate and comprising, in their upper portion located above the plate, a series of lateral orifices distributed over a plurality of levels certain of which are supplied with a liquid phase, the remainder being supplied with the gas phase.

The novel aspect of the manner of supplying said conduits resides in the existence above the plate of a liquid phase retention volume the interface of which with the gas phase above is kept as stable and horizontal as possible to guarantee a regular supply to the conduits which separately receive a gas flow and a liquid flow which is almost constant. To produce that stable and practically horizontal interface, the liquid supply is organized so that the liquid is introduced into the retention volume of said liquid phase to avoid backflow and to limit foaming which can occur with certain fluids at the interface with the gas phase.

The present invention relates to the same field and can increase the stability of the interface between the gas and the liquid. This improves the distribution of the liquid and the liquid/gas mixture over the cross section of the reactor. It can also amortize instantaneous flow rate fluctuations, which are frequent in fluid flow systems, and can limit foaming problems. Its implementation is very simple from a technological standpoint, which renders the present invention particularly suitable to remodeling existing units. However, the invention is also entirely applicable to new units.

The prior art that is relevant to the application cited above is supplemented by United States patent U.S. Pat. No. 4,235,847, which describes a device for mixing and distributing two fluid phases supplied across the two independent lateral lines and employing two annular peripheral zones for separate introduction of the liquid and the gas phase.

In that patent, the liquid phase leaves the annular distribution zone by overflowing from the upper portion of said zone, which can cause perturbations in the interface between the liquid phase and the gas phase. Further, in that patent only the upper portion of the conduits is supplied with a mixed mist type phase. Thus, the device is highly sensitive to variations in the homogeneity of the composition of that mixed phase.

DESCRIPTION OF APPLICATIONS OF THE INVENTION

The present invention is applicable to reactors comprising a plurality of fixed catalytic beds traversed by a downflowing co-current of a gas phase and a liquid phase which can be introduced separately or as a mixture. More particularly, the invention is applicable to reactors for which the liquid flow, i.e., the flow rate of the liquid phase compared with the nominal cross section of the reactor, is in the range 1 to 100 $kg/(m^2.s)$ and usually in the range 20 to 80 $kg/(m^2.s)$. The invention is particularly suitable for the case in which the volume ratio of the gas phase to the liquid phase is in the range 0 to 400 (0 excluded) and preferably in the range 0 to 100 (0 excluded).

The present invention is also applicable to the case in which the reaction requires a close contact between the phases that are present, to facilitate dissolution of one of the compounds of the gas phase, for example hydrogen, in the liquid phase. This case is encountered in selective or complete hydrogenation of hydrocarbon cuts which may contain 2 to 10 carbon atoms or more, which is the particular case of hydrogenation of pyrolysis gasoline.

More generally, the invention is applicable to chemical reactors for carrying out a variety of reactions, in particular hydrocracking, hydrotreatment, hydrodesulphurization, hydrodenitrogenation, hydrogenation of various cuts, such as hydrogenation of aromatic compounds in aliphatic cuts and/or naphthenic cuts, selective hydrogenation of acetylene compounds and diolefin compounds in olefinic cuts, and the hydrogenation of olefins in aromatic cuts.

It can also be used in a reactor for converting synthesis gas (comprising hydrogen and carbon monoxide) to alcohols or hydrocarbons.

The invention is also applicable to reactors carrying out reactions necessitating highly intimate mixing of a gas phase and a liquid phase, for example partial or complete oxidation reactions, amination, acetyloxidation, ammoxidation and halogenation reactions, in particular chlorination.

In the specific field of hydrodesulphurization, hydrodenitrogenation and hydrocracking reactions, and particularly when high conversions are required to obtain a product containing less than 30 ppm or even less than 10 ppm (parts per million) of sulphur, for example, distribution of the gas and liquid phases has to be excellent, as the range for the gas to liquid volume ratio is 1 to 400, usually in the range 1 to 100.

An analogous case to the invention is encountered when using an auxiliary cooling fluid known as a quench, where very good contact between the auxiliary fluid and the reagents (or process fluid) is also necessary.

The device described in the present invention thus concerns fixed bed reactors, for example selective hydrogenation reactors or hydrotreatment reactors for oil cuts, but more generally any fixed bed chemical reactor treating a gas and a liquid feed hereinafter termed a gas phase and a liquid phase, which must be introduced as a mixture over the granular bed or beds in the reactor, that mixture having to be as homogeneous as possible and provide the best possible coverage of the reaction bed or beds.

More particularly, the mixing and distribution device described in the present invention concerns selective hydrogenation reactors in which the volume ratio of the gas to the liquid phase is in the range 3 to 400 and preferably in the range 50 to 300. In the majority of cases, the gas and liquid phases supplying the reactor are introduced separately into the reactor. However, it is possible to treat the case of mixed supply (as a mixture) of the two phases, possibly by installing a device that encourages separation of the liquid and gas phases such as a honeycomb type coalescer. The remainder of the description describes the case of separate supply of the gas and liquid phases to the reactor.

DESCRIPTION OF THE FIGURES

FIG. 1 shows a view of the upper portion of a reactor provided with a distributor plate comprising a certain number of conduits. The liquid phase arrives via a lateral tube into an annular zone in accordance with the present invention.

FIG. 1bis is a variation of the invention in which the annular zone is closed at its upper portion by a top forming a continuous surface.

FIG. 2 is a top view of a distribution device that shows the annular zone and its disposition with respect to the conduits. FIG. 2 bis shows the fixing means for the wall defining the annular zone.

FIG. 3 shows two embodiments of the lower cross sections of flow bringing the annular zone and the central portion of the distributor plate into communication.

Referring now to FIG. 1: the gas phase (11) is generally introduced via the reactor top via a tube (1). The liquid phase (12) is introduced via a line (2) traversing the side wall of the reactor at a level between the distributor plate (20) and the lateral orifices (42) of the conduits (40) supported by the plate (20), such that the liquid phase opens into an annular vessel or chamber (28) located at the periphery of the reactor (10).

The outer side of the annular chamber (28) is defined by the wall of the reactor (13) and the inner side by a substantially cylindrical wall (30) which is concentric with the reactor wall, located in the space between said reactor wall (13) and the outermost located conduits.

In a top view of the reactor as shown in FIG. 2, the outermost located conduits, i.e. those forming part of the largest diameter circle, leave a free space with respect to the wall of the reactor (13) inside which is the annular chamber (28) the outer wall of which is identical with the wall of the reactor (13). A primary aim of this annular chamber is to create a "buffer" volume in which fluctuations in the liquid/gas interface will be amortized.

The central zone of the plate containing the conduits is thus supplied with liquid via its lower portion. This prevents a liquid jet deriving from the reactor inlet from perturbing the gas/liquid interface located above the plate and from creating turbulence and/or foaming in the liquid zone. Turbulence and foaming are phenomena which should be minimized when supplying fixed bed reactors as they substantially perturb the homogeneity of the distribution of the gas and liquid phases, which is a vital condition for proper supply to the bed itself. The device of the present invention indirectly contributes to reducing foaming and turbulence.

The annular chamber (28) is provided, preferably in its lower portion, i.e. the portion located close to the plate, with passages (32) that allow communication of the liquid phase with the central portion of the distributor plate (20). These passages which we term lower cross sections of flow (32) can form an assembly of discrete openings or a continuous opening.

In accordance with the invention, the term "lower cross section of flow" (32) is used to define a cross section of passage such as an orifice or slot disposed at a lower level with respect to the higher level of the inner wall (30) of the annular chamber (28). Thus, these lower cross sections of flow are located below the mean overflow level of the liquid above the inner wall (30).

Preferably, certain or the majority or all of said lower cross sections of flow are located in the lower half of the inner wall (30), typically below (the axis) of the liquid supply (20). Preferably again, the wall (30) comprises a plurality of lower cross sections of flow, distributed substantially along the periphery of the wall (30).

Preferably, the liquid inlet (2) is not located facing a lower cross section of flow (32) to avoid a lack of equilibrium in the supply at this location.

A further important point is that the cross sections of flow of the liquid from the annular chamber (28) to the centre of the distributor plate (20) via said lower cross sections of flow (32) remain between certain limits so that they preserve the interface between the liquid phase and the gas phase located above, limiting turbulence.

Thus, the invention concerns a device for mixing and distributing a liquid phase and a gas phase placed inside a vertical reactor (10) upstream of a granular bed or between two successive granular beds, said device comprising a substantially horizontal plate (20) covering the whole cross section of the reactor and supporting a plurality of substantially vertical conduits (40), generally with a constant cross section, comprising:

an upper end (43) communicating with the portion of the reactor located above the plate (20);

a lower end (21) communicating with the portion of the reactor located below the plate (20);

said conduits comprising lateral orifices (42) disposed along their vertical wall at different levels, allowing the gas phase and the liquid phase to be introduced inside the conduits, at least partially separated;

said device comprising a substantially vertical inner wall (30), generally fixed to the plate (20) at its lower portion, and located in the space between the wall of the reactor (13) and the zone occupied by the conduits, and defining an annular zone (28) which receives at least the liquid phase from outside the reactor and which communicates with the central portion of the plate (20) by means of lower cross sections of flow (32). Typically, the majority or all of said lower cross sections of flow are disposed on the lower portion of the inner wall (30).

The distance separating the lower cross sections of flow (32) and the lowest lateral orifices (42) on the conduits (40) (typically disposed at a higher level) is generally more than 20 mm and preferably in the range 100 to 300 mm, and the level of the liquid volume located in the annular zone (28) is typically higher than the level of the liquid volume over the plate (20) by at least 1 cm to ensure a sufficient flow of liquid through said cross sections of flow.

Preferably, said level is generally in the range 1 to 10 cm. The flow rate of the liquid phase through the lower cross sections of flow (32) is preferably in the range 0.5 to 5 m/s. This can be achieved by suitable sizing of the lower cross sections of flow, taking into account the liquid flow rate. The width of the annular zone (28) is generally less than 5% of the diameter of the reactor, and preferably less than 2% of the diameter of the reactor.

The height of the inner wall (30) is preferably defined so as to be higher than the level of the highest lateral orifices (42), and lower than the level of the upper end (43) of the conduits (40).

The upper portion of the annular zone (28) can in some cases be closed by a top (35) which renders it tight to the gas phase.

The inner wall (30) can be fixed at its upper portion by tabs connecting it to the wall of the reactor, to free a cross section of flow in the form of a substantially continuous slot at its lower portion. However, any other fixing means is possible, and the invention is not limited to a particular fixing mode for the inner wall (30).

The device of the present invention can in particular but not in a limiting fashion be applied to selective hydrogenation reactors in which the ratio of the gas phase to the liquid phase is in the range 1 to 400 by volume, preferably in the range 1 to 100 by volume.

FIG. 1 shows an embodiment of the distribution device of the present invention in the case in which the distribution device is located at the inlet to a reactor (10) upstream of a granular bed (50) constituted by solid particles that may contain a catalytic phase. The reactor (10) may contain a plurality of beds of this type distributed over the height of the reactor and separated by a sufficient space to allow a distribution device as described in the present application to be positioned at the head or each bed or at least certain thereof. For devices in accordance with the invention located between two superimposed catalytic beds, it is possible to install a gas/liquid separation device upstream of the distribution device to supply the liquid to the annular chamber of the distribution device. This type of reactor comprising a plurality of spaced granular beds is used in a large number of refining and petrochemicals processes, particularly in processes for selective hydrogenation of hydrocarbon cuts containing 2 to 7 carbon atoms.

The distribution device is constituted by a substantially horizontal plate (20) covering approximately the whole cross section of the reactor (10). The plate (20) supports a plurality of conduits (40) opening at their upper end via an upper opening (43) and having along their lateral wall a series of lateral orifices (42) intended for the separate passage of the liquid phase and the gas phase inside the conduits, to mix them intimately inside said conduits.

The shape of said lateral orifices can vary widely, generally circular or rectangular, said orifices preferably being distributed over each of the conduits on a plurality of levels that are substantially identical from one conduit to another, generally at least two levels, and preferably 3 to 10 levels, to allow the establishment of as regular an interface as possible between the gas phase and the liquid phase over the whole of the envisaged operating range.

The distance between two successive levels is generally over 20 mm, and preferably in the range 50 mm to 150 mm. The maximum width of the lateral orifices which, depending on their shape, will correspond to the diameter if it is a circular orifice or to the width in the case of a rectangular orifice, will advantageously be less than 75% of the diameter of the conduits (40) and normally more than 2 mm.

The device of the present invention functions on the principle of allowing the gas and liquid phases to mix inside the conduits (40) before injecting this mixture at different points optimally covering the cross section of the reactor, via the open lower ends (21) of the conduits (40). In order to ensure the best possible distribution of the mixture of gas and liquid phases leaving the conduits (40) via the lower ends (21), a certain density of conduits is required. This density is generally in the range 100 to 700 conduits per $m^2$ of bed cross section, and preferably it is in the range 150 to 500 conduits per $m^2$ of bed.

In accordance with one characteristic of the present invention, an annular chamber (28) runs along the wall of the reactor and comprises an inner envelope (30) hereinafter termed the inner wall, said inner wall generally being substantially circular and concentric with the reactor, and typically fixed to the plate (20) via its lower portion.

The inner wall (30) is substantially vertical and positioned in the space comprised between the wall of the reactor (13) and the outermost series of conduits. The positioning of the inner wall (30) is such that the width of the annular zone is generally less than 5% of the diameter of the reactor and preferably less than 2% of the diameter of the reactor. This width is typically less than the distance separating two neighbouring conduits (40), which distance is more accurately known as the interaxial distance.

The lower portion of the inner wall (30) is provided with openings (32) termed lower cross sections of flow, bringing the annular zone (28) into communication with the central portion of the plate (20).

In certain cases, the inner wall (30) can comprise a continuous top (35) shown in FIG. 1*bis*, which renders it tight to the gas phase. In this case, the liquid phase occupies the whole of the annular zone defined by the wall of the reactor (13), the inner vertical wall (30) and the continuous top (35). The preferred variation, however, is the variation in which the upper portion of the annular zone is open and communicates with the gas phase of the reactor.

The liquid phase, shown by the flow (12), is introduced into the annular zone (28) from outside the reactor via a line (2) traversing the reactor wall. It is distributed throughout the annular zone, creating a liquid volume the height of which is typically lower than the height of the inner wall (30) to prevent any liquid from overflowing over the inner wall (30).

This carries out two technical functions:
  the annular zone acts as a buffer zone to fluctuations in the liquid flow: when an instantaneous flow which is greater than the mean flow rate occurs in the annular zone, the liquid level rises in the annular zone while the interface in the central zone of the conduits does not rise much. The annular zone (28) thus amortizes fluctuations in the flow, which would not occur in the absence of the lower cross sections of flow (the liquid would then supply the central zone by overflowing, without a buffer effect);
  the absence of liquid overflow also avoids foaming and/or turbulence in the central zone of the plate.

To this end, the relationship between the flow rate of the liquid phase entering the annular zone, the lower cross sections of flow (32) and the height of the inner wall (30) must be respected. The skilled person could readily determine the lower cross sections of flow (and in particular a sufficient total cross section, taking into account the height of the inner wall (30), to avoid overflows (under normal operational conditions) over the upper portion of the inner wall (30). The inner wall (30) is higher than the highest level of the lateral orifices (42) of the conduits (40), but is below the level of the uppermost openings (43).

When the annular zone comprises a top, the height of the inner wall (30) will simply be less than the level of the upper openings (43).

The liquid phase passes from the annular zone (28) to the central portion of the plate (20) through the lower cross sections of flow (32). These lower cross sections of flow (32)

are typically located at a level lower than the lowest level of the lateral orifices (42), so that said lower cross sections of flow are entirely immersed in the retention volume of the liquid contained in the annular zone (28). Thus, a first level is established either side of the inner wall (30), which can fluctuate as a function of sudden changes in the liquid flow, corresponding to the liquid retention volume in the annular zone (28), and a second level corresponding to the liquid retention volume of the plate (20).

This second level supplies the lateral orifices (42) of the conduits (40). This second level defines, with the gas phase above it, a particularly stable and almost horizontal interface, as any variation in the flow rate of the liquid phase (12) entering the reactor will have an effect on the liquid retention volume of the annular zone (28) which will then play the role of a buffer zone to the liquid retention volume over the plate (20). The existence of this stable interface, which is also as flat as possible, above the liquid retention volume of the plate (20) and which is thus non foaming, guarantees a regular and uniform supply to the plurality of conduits (40) by means of the lateral orifices (42).

The distance shown as (H) in FIG. 1 separating the level of the lower cross sections of flow (32) and the lowest level of the lateral orifices (42) is usually more than 20 mm, and preferably in the range 100 mm to 300 mm. This distance (H) has the effect firstly of maintaining a sufficient liquid retention volume above the plate (20) to dissipate at least a portion of the kinetic energy of liquid jets from the lower cross sections of flow (32) located below the lateral orifices (42), thereby preventing those liquid jets from perturbing the interface between the liquid retention volume and the gas phase above it which must also remain as flat as possible regardless of the level at which it is established.

The distance (H) also creates a minimum residence time for the mixture of gas and liquid phases inside the conduits (40), and thus optimizes mass transfer between said gas and liquid phases, which endows the conduits (40) with the role of a static mixer. Finally, the conduits (40) are generally extended by a distance (h) below the plate (20) to prevent a portion of the mixture derived from the conduits (40) from propagating over the lower surface of the plate (20), and to reduce the distance (d) separating the lower ends (21), the outlets from the conduits (40), from the upper level of the granular bed located below the plate (20).

The distance (h) is generally in the range 10 to 100 mm, and preferably in the range 20 to 80 mm. To avoid segregating the mixture of liquid and gas phases formed inside the conduits (40), the distance between the lower ends (21) of the conduits (40) and the upper level of the granular bed (22) is often in the range 0 to 50 mm, 0 excluded, and preferably in the range 0 to 20 mm, 0 excluded.

Finally, in the upper portion of the catalytic granular bed (22) and resting thereon, there is generally a layer of inert spherical particles (50), termed the guard bed, to maintain intact or as little disturbed as possible the distribution of the mixture of gas and liquid phases leaving the conduits (40) to the upper level of the granular bed (22).

Said layer of inert particles is generally more than 50 mm thick and preferably in the range 100 to 300 mm. The diameter of the inert particles used to constitute said layer is generally more than 6 mm and preferably more than 15 mm.

The rate of injection of the liquid to the lower cross sections of flow (32) is generally calculated so that the liquid level in the annular zone (28) is higher than the liquid level in the central portion by 1 to 10 cm. The speed of the liquid traversing the lower cross sections of flow (32) is generally in the range 0.5 to 5 m/s.

The gas and liquid phase admitted into the conduits (40) via the lateral orifices (42) are mixed inside the conduits (40). The interface between the liquid retention volume above the plate (20) and the gas phase can separate the lateral orifices (42) into a first lower group immersed in the liquid retention volume and which serves to introduce liquid inside the conduits (40), and a second upper group, i.e. corresponding to the non-immersed portion of the conduits, which acts to introduce the gas phase inside said conduits. The gas and liquid phases are then introduced separately into each conduit (40).

It should be noted that the lateral orifices (42) disposed over a plurality of levels along the conduits (40) are not specifically assigned to passing the liquid phase or the gas phase, but are naturally distributed as a function of the position of the liquid interface above the plate (20) into a first lower group ensuring the passage of the liquid phase and a second upper group ensuring the passage of the gas phase. Since the two lower and upper groups form two series which are clearly separated by a clearly defined almost horizontal plane, it is vital that the interface between the liquid retention volume and the gas phase is itself defined as clearly as possible and is as stable as possible. The invention has the precise aim of guaranteeing the quality of said interface the position of which can clearly vary as a function of the operating conditions.

Clearly, the higher the flow rate of the liquid phase, the higher the level of the interface between the liquid retention volume and the gas phase, but this level generally does not exceed the level of the upper openings (43) in the conduits (40).

FIGS. 2 and 2bis show a top view of a distribution device of the invention in the case in which the conduits (40) are disposed in a triangular pattern. FIG. 2 clearly shows that there are no conduits in the annular zone (28). FIG. 2bis shows that the inner wall (30) can be fixed to the wall of the reactor (13) via fixing tabs (36) so that if necessary, a continuous cross section of flow (32) can be provided in the lower portion of the wall (30).

The distance between the conduits (40) and the inner wall (30) can be reduced as much as desired.

FIG. 3 shows two embodiments of cross sections of flow located in the lower portion of the inner wall (30). These cross sections of flow can be slots with a rectangular cross section as shown at (33), or circular or triangular as shown at (34). These cross sections of flow can also be in the form of a continuous or substantially continuous slot. When the slots form a discrete ensemble, it may be possible to have a distance h' between the lower edge of said slots and the level of the plate (20). This distance h' is preferably in the range 0 to 30 mm, 0 excluded.

EXAMPLE

A comparative test was carried out between a prior art distribution device constituted by a perforated conduit plate supplied with a flow of gas along the reactor axis and a liquid flow injected directly into the liquid retention volume located above the plate from a tube traversing the lateral wall of the reactor, and a device of the invention, as described in FIG. 1, comprising a perforated conduit plate supplied with gas in the same manner as with the prior art device and with liquid via a radial tube opening onto the side wall of the reactor at a distance of 100 mm above the plate and opening into the annular zone described in the present invention.

The annular chamber described in the invention is delimited by a circular inner wall and by the side wall of the reactor. The two devices were tested in a 400 mm diameter reactor. The distributor plate itself was identical in the prior art distribution device and in the device of the present invention.

The distribution device was constituted by a plate on which 55×15 mm diameter conduits were fixed. The conduits were perforated with 20 circular 7 mm diameter orifices distributed over 10 levels 50 to 250 mm from the level of the plate.

In the device of the present invention, the liquid was introduced from the line (2) using a tube traversing the side wall of the reactor in the geometry described in FIG. 1. A circular wall defined a 30 mm wide annular zone located between the wall (30) and the side wall of the reactor. The distance between the level of the cross sections of flow of the circular wall (30) and the lowest level of the orifices in the conduits was 50 mm.

Figure 4A:
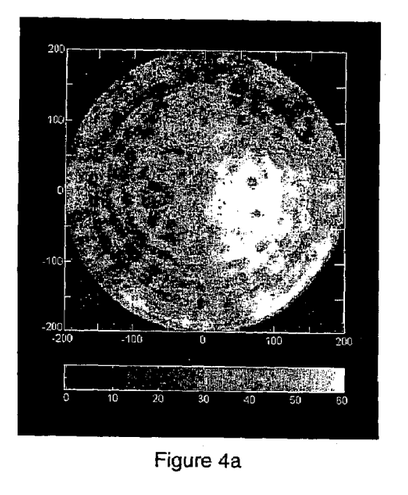
FIGS. 4a and 5a are tomographs intended to illustrate a comparative example and an example in accordance with the invention respectively.

A comparison of the distribution of the amount of gas measured in the catalytic bed at a distance of 500 mm below the lower end of the conduits (4) was carried out using gamma ray tomography. FIGS. 4a; 4b and 5a; 5b show images of the gas measured when the prior art distribution device was used (FIGS. 4a and 4b) and when the distribution device of the present invention was used (FIGS. 5a and 5b) respectively.

The colour spectrum extends from black for zero gas (liquid flow only) to white for 60% gas. The liquid flow with respect to the nominal cross section of the reactor was 56 kg/(m².s) and the gas flow rate was 1 kg/(m².s). FIGS. 4a and 5a represent an image of the gas flow over the whole cross section of the catalytic bed and FIGS. 4b and 5b show a gas profile across a reactor diameter.

As can be seen, in the absence of the device for retaining liquid in the annular zone, the distribution of gas in the cross section of the bed was substantially degraded in the sense that FIG. 4a (prior art) shows less uniform levels of grey than those of FIG. 5a (in accordance with the invention).

Figure 4B:
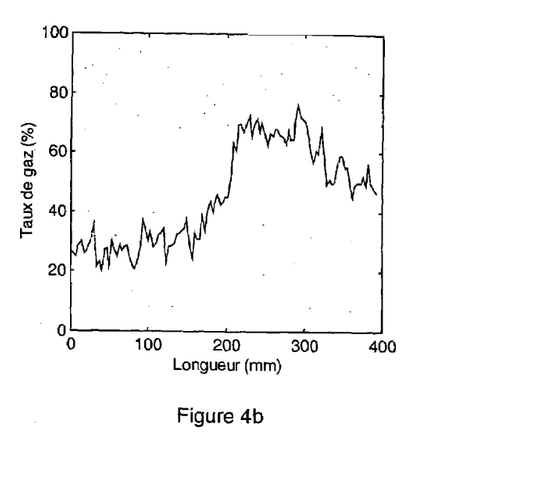
FIGS. 4b and 5b are gas phase concentration profiles across a reactor diameter derived from the tomographs.
Figure 5A:
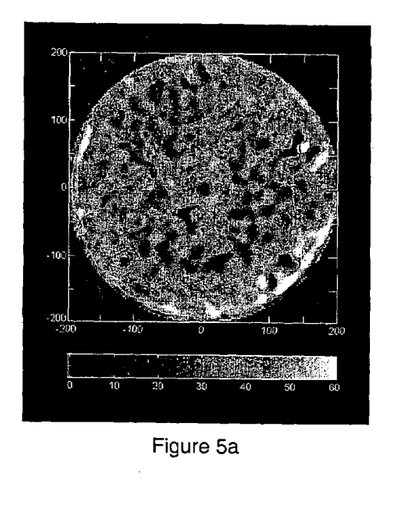
Figure 5B:
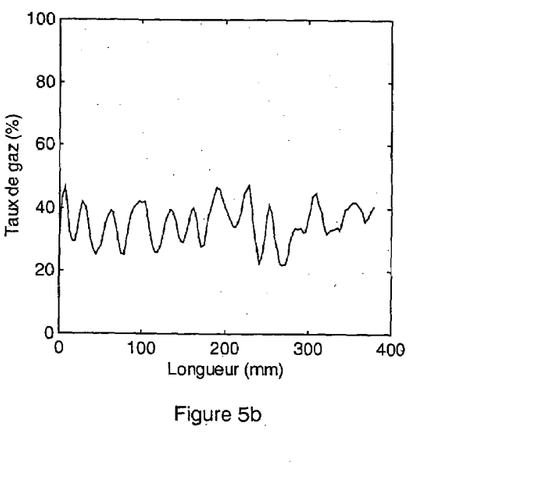

As also shown by the profile obtained over a diameter of the reactor of FIG. 4b, the gas is not at all homogeneous over the entire cross section in the absence of the annular zone for retaining liquid from the radial line (2). The liquid level is unbalanced because of dissipation of the kinetic energy of the liquid jet which impacts on the gas/liquid interface and substantially perturbs the interface, and the conduits are not all supplied in the same manner. In contrast, with the device described in the present application, a much more homogeneous distribution of gas over the entire cross section of the bed is obtained, as shown in FIG. 5b.

The invention not only concerns a device for distributing a liquid and a gas phase, but also concerns any chemical reactor comprising such a device and any chemical process using such a reactor. Typically, such a reactor comprises at least one fixed bed supplied in co-current downflow mode with a gas phase and a liquid phase, the volume ratio between the gas phase and the liquid phase being in the range 1 to 400, and preferably in the range 1 to 100. The invention is particularly applicable to processes for converting synthesis gas (mixtures of hydrogen and carbon monoxide) and to processes for selective hydrogenation of hydrocarbons containing 2 to 7 carbon atoms, limits included, and to processes for the hydrotreatment of hydrocarbon, for example gas oil cuts.

The invention claimed is:

1. A device for mixing and distributing a liquid phase and a gas phase inside a vertical reactor having an outer wall, said vertical reactor being upstream of a granular bed or between two successive granular beds, said device comprising:

a substantially horizontal plate (20) covering the entire cross section of the reactor and supporting a plurality of substantially vertical conduits (40) comprising an upper end (43) communicating with the portion of the reactor located above the plate (20) and a lower end (21) communicating with the portion of the reactor located below the plate (20) said plurality of substantially vertical conduits defining a zone spaced away from the outer wall of the reactor;

said conduits comprising lateral orifices (42) at different levels disposed along their vertical wall and allowing the gas phase and the liquid phase to be introduced into the conduits at least partially in a separated manner;

said device comprising a substantially vertical inner wall (30) located in the space comprised between the wall of the reactor and the zone occupied by the conduits, and defining with said outer wall an annular zone (28) for receiving at least the liquid phase from outside the reactor and which communicates with the central portion of the plate (20) by means defining lower cross sections for flow (32).

2. A device according to claim 1, in which the distance separating the means defining lower cross sections for flow (32) and the lowest lateral orifices (42) of the conduits (40) is more than 20 mm, the means defining the lower cross sections for flow (32) being disposed below the lateral orifices (42).

3. A device according to claim 2, wherein said distance is in the range of 100 to 300 mm.

4. A device according to claim 1, comprising a plurality of means defining lower cross sections for flow entirely or mainly disposed in the lower half of the inner wall (30).

5. A device according to claim 1, in which the dimensions the lower means defining the cross sections for flow (32) allow the liquid level in the annular zone to remain below the overflow level corresponding to the upper portion of the inner wall (30).

6. A device according to claim 1, in which the dimensions of the means defining the lower cross sections for flow allow the flow rate of the liquid phase through said means defining lower cross sections of flow (32) is in the range of 0.5 to 5 m/s.

7. A device according to claim 1, in which the width of the annular zone (28) is less than 5% of the diameter of the reactor.

8. A device according to claim 7, wherein said width is less than 2% of the diameter of the reactor.

9. A device according to claim 1, in which the inner wall (30) is higher than the level of the highest lateral orifices (42) and lower than the level of the upper end (43) of the conduits (40).

10. A device according to claim 1, in which the upper portion of the annular zone (28) is closed by a gas-tight top (35).

11. A chemical reactor comprising a device according to claim 1, said reactor comprising one or more fixed beds at least one of which is supplied with a downflowing co-current of a gas phase and a liquid phase, the volume ratio between the gas phase and the liquid phase being in the range of 1 to 400.

12. A process comprising providing at least one reactor according to claim 11 and conducting a selective hydrogenation of hydrocarbons containing 2 to 7 carbon atoms in said at least one reactor.

13. A process comprising providing at least one reactor according to claim 11 and conducting a hydrotreatment of hydrocarbons in said at least one reactor.

14. A chemical reactor according to claim 11, wherein the volume ratio is in the range of 1 to 100.

* * * * *